(12) United States Patent
Chittamuru et al.

(10) Patent No.: US 11,853,605 B2
(45) Date of Patent: Dec. 26, 2023

(54) DATABASE PERSISTENCE (71) Applicant: Micron Technology, Inc., Boise, ID (US)

(72) Inventors: Sai Vineel Reddy Chittamuru, Austin, TX (US); Paul Rosenfeld, Rockville, MD (US); Robert M. Walker, Raleigh, NC (US); Jeffrey L. Scott, Apex, NC (US)

(73) Assignee: Micron Technology, Inc., Boise, ID (US)

( * ) Notice: Subject to any disclaimer, the term of this patent is extended or adjusted under 35 U.S.C. 154(b) by 103 days.

(21) Appl. No.: 17/478,570

(22) Filed: Sep. 17, 2021

(65) Prior Publication Data

US 2023/0085712 A1 Mar. 23, 2023

(51) Int. Cl.
*G06F 3/06* (2006.01)
*G06F 16/215* (2019.01)

(52) U.S. Cl.
CPC .......... *G06F 3/0659* (2013.01); *G06F 3/0604* (2013.01); *G06F 3/0679* (2013.01); *G06F 16/215* (2019.01)

(58) Field of Classification Search
CPC .... G06F 3/0659; G06F 3/0604; G06F 3/0679; G06F 3/0614; G06F 3/0655; G06F 3/0683; G06F 3/0688; G06F 2212/286; G06F 16/215
See application file for complete search history.

(56) References Cited

U.S. PATENT DOCUMENTS

| | | | |
|---|---|---|---|
| 9,367,472 B2 | 6/2016 | Bridge, Jr. et al. | |
| 9,432,240 B2 | 8/2016 | Galchev | |
| 9,514,007 B2 | 12/2016 | Gupta et al. | |
| 9,779,127 B2 | 10/2017 | Sardina et al. | |
| 10,204,022 B2 | 2/2019 | Marathe et al. | |
| 10,489,158 B2 | 11/2019 | Wang et al. | |
| 10,572,407 B2 * | 2/2020 | Xu | G06F 3/0658 |
| 10,817,502 B2 | 10/2020 | Talagala et al. | |
| 10,884,869 B2 | 1/2021 | Shaull | |
| 2015/0095693 A1 * | 4/2015 | Chinnakkonda Vidyapoornachary | G06F 11/1666 714/6.23 |
| 2017/0104820 A1 * | 4/2017 | Golander | H04L 67/1097 |

(Continued)

OTHER PUBLICATIONS

Alwadi M, Kommareddy VR, Hughes C, Hammond SD, Awad A. Stealth-persist: Architectural support for persistent applications in hybrid memory systems. In2021 IEEE International Symposium on High-Performance Computer Architecture (HPCA) Feb. 1, 2021 (pp. 139-152). IEEE.*

(Continued)

*Primary Examiner* — Tracy A Warren
(74) *Attorney, Agent, or Firm* — Brooks, Cameron & Huebsch, PLLC (57) ABSTRACT

A method includes, responsive to a SET command associated with a key-value store, concurrently updating the key-value store maintained on a non-persistent memory device of a memory sub-system and a mirror of the key-value store maintained on a persistent memory device of the memory sub-system. The method further includes responsive to a GET command associated with the key-value store, retrieving a value of a key from the key-value store maintained on the non-persistent memory device.

23 Claims, 6 Drawing Sheets

(56) References Cited

U.S. PATENT DOCUMENTS

| | | | |
|---|---|---|---|
| 2019/0042372 A1* | 2/2019 | Kumar | G06F 11/1464 |
| 2019/0278849 A1* | 9/2019 | Chandramouli | G06F 16/24565 |
| 2020/0334292 A1* | 10/2020 | Ganeshan | G06F 3/0667 |
| 2022/0012222 A1* | 1/2022 | Ahmadi | G06F 9/345 |
| 2022/0027349 A1* | 1/2022 | Shuo | G06F 16/2282 |
| 2022/0138052 A1* | 5/2022 | Subramanian | G06F 11/1464 711/162 |
| 2022/0382651 A1* | 12/2022 | Lu | G06F 16/27 |

OTHER PUBLICATIONS

GeeksforGeeks, "Crossbar Switch," May 4, 2020, available: https://www.geeksforgeeks.org/crossbar-switch/.*

* cited by examiner

FIG. 6

DATABASE PERSISTENCE

TECHNICAL FIELD

Embodiments of the disclosure relate generally to memory sub-systems, and more specifically, relate to memory sub-systems for database persistence.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-systems, in particular to memory sub-systems that include a memory sub-system database persistence component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A memory device can be a non-volatile memory device. One example of non-volatile memory devices is a negative-and (NAND) memory device (also known as flash technology). Other examples of non-volatile memory devices are described below in association with FIG. 1. A non-volatile memory device is a package of one or more dies. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Some previous approaches to database persistence may include a database file based on a snapshot of a database. The snapshot may be used as a backup of the database. The snapshot may be a copy of the entire database at the time when the snapshot was generated. Changes to the database that occur between generation of snapshots of the database may not be reflected in the snapshots. In response to a request for data value of the database, the data value may be retrieved from the database but not from the snapshot.

In some previous approaches to database persistence, an append-only file (AOF) may be generated. An AOF of a database is updated as data values of the database are updated. An AOF may be analogized to a journal of writes to the database. Unlike a snapshot of a database, an AOF may not be a copy of the database. Rather, an AOF may be used to reconstruct the database. An AOF may be a more durable approach to database persistence than a snapshot because every write to the database is recorded in the AOF. Maintaining an AOF of a database may negatively affect performance of a system hosting and/or maintaining the database. An AOF may be a more durable means by which to provide persistent data because every SET operation is recorded in the AOF. However, generation of an AOF may incur a significant performance penalty because each SET operation needs to be passed to the AOF through a storage stack of an operating system (OS) (executed by a host system, for instance). Some previous approaches may include a combination of a snapshot of database and an AOF. However, previous approaches that utilize both a snapshot and an AOF do not provide a full copy of a database that is continuously updated.

Aspects of the present disclosure address the above and other deficiencies by providing a memory sub-system that maintains a full copy of a database that is continuously updated. For example, in some embodiments, a database can be stored on a memory device of a memory sub-system and a mirror of the database can be stored on a persistent memory device. As used herein, "persistent memory" or "persistent memory device" refers to a non-volatile memory or memory device, respectively. As used herein, "non-persistent memory" or "non-persistent memory device" refers to a volatile memory or memory device, respectively. As used herein, "mirror" of a database refers to a duplicate of a database in which changes to the mirror may lag slightly behind changes to the database. For instance, characteristics (e.g., physical characteristics, electrical characteristics) of a persistent memory device on which a mirror of a database is stored may cause the mirror to not fully reflect a change to the database stored on a non-persistent memory device for a brief moments (e.g., nanoseconds) subsequent to the change to the database.

A mirror of a database stored on a persistent memory device can be updated concurrently with updates to a database stored on a non-persistent memory device. A change to one or more data values of the database stored on the non-persistent memory device is reflected, concurrently, in the mirror of the database stored on the persistent memory device. However, data values can be retrieved from the database stored on the non-persistent memory device, but not from the mirror of the database stored on the persistent memory device. A request for one or more data values of the database is serviced by the non-persistent memory device.

A non-limiting example of a database described herein is a key-value store. A key-value store can be a data storage mechanism for storing data in, retrieving data from, and/or managing associative memory arrays. A key-value store can utilize a dictionary data structure to store key-value pairs. A SET operation can be performed, in response to a SET command, for example, to create one or more values of one or more keys and/or update one or more values of one or more keys of a key-value store. A GET operation can be performed, in response to a GET command, for example, to retrieve one or more values of one or more keys from a key-value store. Some embodiments of the present disclosure can include maintaining a key-value store in two dictionaries. SET and GET operations can be performed using a key-value store maintained as a primary dictionary. SET operations, but not GET operations, can be performed using a mirror of the key-value store maintained as a secondary dictionary. Address regions of the secondary dictionary can be mapped to a persistent memory device of a memory sub-system. Maintaining a mirror of a key-value store as a second dictionary can provide faster operation-level persistence than previous approaches that include AOF persistence.

Figure 1:
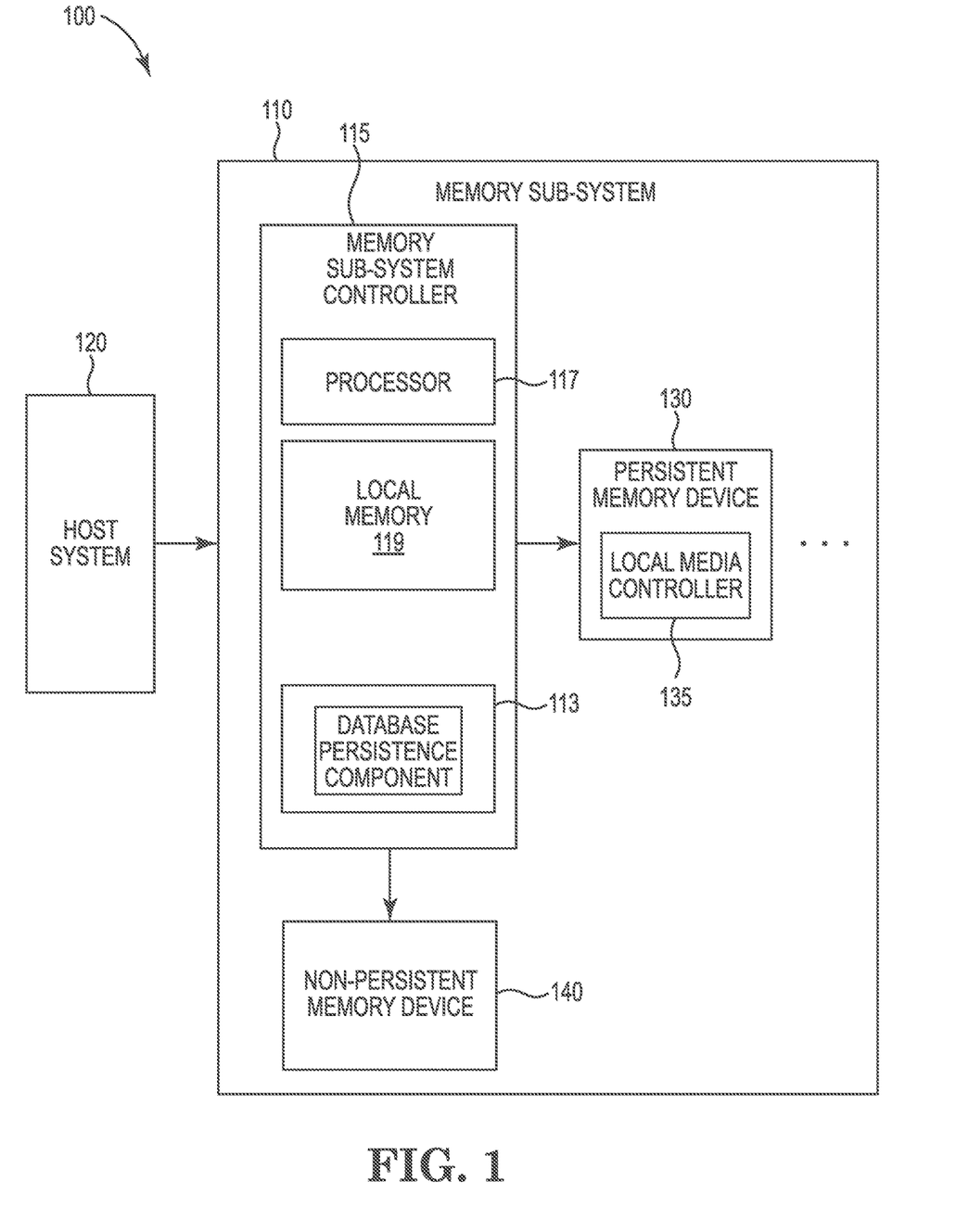
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., non-persistent memory device 140), one or more non-volatile memory devices (e.g., persistent memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports DDR), Open NAND Flash Interface (ONFI), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., persistent memory device 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The persistent memory device 130 and the non-persistent memory device 140 can include any combination of the different types of non-volatile memory devices and volatile memory devices, respectively. Some examples of volatile memory devices can be, but are not limited to, random access memory (RAM), such as dynamic random-access memory (DRAM) and synchronous dynamic random access memory (SDRAM).

Some examples of non-volatile memory devices include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The persistent memory device 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, the persistent memory device 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory device 130 can be grouped as pages that can refer to a logical unit of the respective memory devices used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the persistent memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Memory sub-system controller 115 can communicate with the memory device 130 and the persistent memory device 131 to perform operations, such as reading data (e.g., GET operations), writing data (e.g., SET operations), and/or erasing data (e.g., SET operations) stored on the persistent memory device 130 and the non-persistent memory device 140, and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the persistent memory device 130 and/or the non-persistent memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the persistent memory device 130. The memory sub-system controller 115 can further include host interface circuitry to communicate with the host system 120 via the physical host interface. The host interface circuitry can convert the commands received from the host system 120 into command instructions to access the persistent memory device 130 and/or the non-persistent memory device 140 as well as convert responses associated with the persistent memory device 130 and/or the non-persistent memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the persistent memory device 130 and/or the non-persistent memory device 140.

In some embodiments, the persistent memory device 130 include a local media controller 135, respectively, that operate in conjunction with memory sub-system controller 115 to execute operations on one or more memory cells of the persistent memory device 130. An external controller (e.g., the memory sub-system controller 115) can externally manage the persistent memory device 130 (e.g., perform media management operations on the memory device 130). In some embodiments, the persistent memory device 130 can be a managed memory device. A managed memory device is a raw memory device combined with a local controller (e.g., the local controller 135) for media management within the same memory device package. An example of a managed memory device is a managed NAND (MNAND) device.

The memory sub-system 110 can include a database persistence component 113. Although not shown in FIG. 1, the database persistence component 113 can include circuitry to facilitate maintaining a database stored on the non-persistent memory device 140 and a mirror of the database stored on the persistent memory device 130. In some embodiments, the database persistence component 113 can include special purpose circuitry in the form of an ASIC, FPGA, state machine, and/or other logic circuitry that can enable the database persistence component 113 to update and retrieve data values of a database stored on the non-persistent memory device 140 and update, but not retrieve, data values of a mirror of the database stored on the persistent memory device 130, for example. However, data values of the mirror of the database can be retrieved from the persistent memory device 130, by the database persistence component 113 or another component of the computing system 100, to recover the database.

In some embodiments, the memory sub-system controller 115 includes at least a portion of the database persistence component 113. For example, the memory sub-system controller 115 can include the processor 117 (e.g., processing device) configured to execute instructions stored in the local memory 119 for performing the operations described herein. In some embodiments, the database persistence component 113 can be part of the host system 120, an application, or an operating system.

In a non-limiting example, an apparatus (e.g., the computing system 100) can include the database persistence component 113. The database persistence component 113 can be resident on the memory sub-system 110. As used herein, the term "resident on" refers to something that is physically located on a particular component. For example, the database persistence component 113 being "resident on" the memory sub-system 110 refers to a condition in which the hardware circuitry that comprises the database persistence component 113 is physically located on the memory sub-system 110. The term "resident on" can be used interchangeably with other terms such as "deployed on" or "located on," herein.

The database persistence component 113 can be configured to cause data values of a database stored on the non-persistent memory device 140 to be updated and/or retrieved. The database persistence component 113 can be configured to cause, concurrent with and/or in response to updates to the database stored on the non-persistent memory device 140, corresponding updates to a mirror of the database stored on the persistent memory device 130. As described above, the memory components can be memory dies or memory packages that form at least a portion of the non-persistent memory device 140 and/or the persistent memory device 130. In some embodiments, the memory sub-system 110 can include memory components arranged to form a stackable cross-gridded array of memory cells.

In some embodiments, the database persistence component 113 can be configured to cause one or more data values of the database stored on the non-persistent memory device 140 to be removed from the non-persistent memory device 140 based on a data temperature of the data values. As used herein "data temperature" of metadata, corresponding to data value, that are indicative of a likelihood of the data values being accessed (e.g., read, written, erased) in the near future. Data values that have not been accessed recently (e.g., not within a threshold amount of time) have decreased or lower data temperatures whereas data values that have been accessed recently (e.g., within a threshold amount of time) have increased or higher data temperatures. The database persistence component 113 can be configured to cause data values of the database stored on the non-persistent memory device 140 based on respective data temperatures of the data values and maintain all data values of the database stored on the persistent memory device 130 irrespective of the data temperatures of the data values. The database persistence component 113 can be configured to cause data values of the database stored on the non-persistent memory device 140 to be removed from the non-persistent memory device 140 in response to a data temperature of the data values being below a threshold data temperature.

Figure 2:
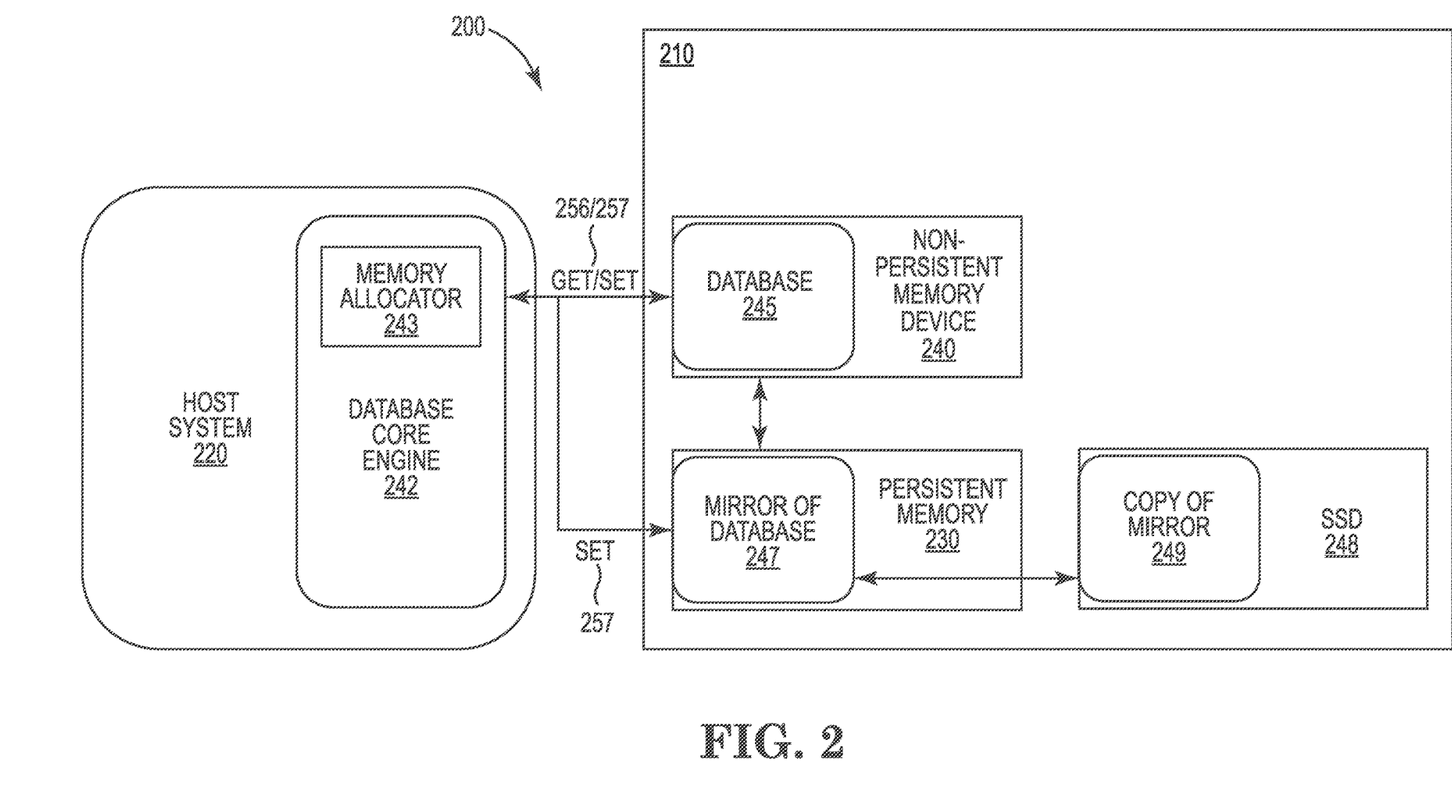
FIG. 2 is a block diagram of a system for database persistence in accordance with some embodiments of the present disclosure.

FIG. 2 is a block diagram of a system for database persistence in accordance with some embodiments of the present disclosure. The host system 220, non-persistent memory device 240, and persistent memory device 230 can be analogous to the host system 120, non-persistent memory device 140, and persistent memory device 130 described in association with FIG. 1.

In accordance with a number of database persistence schemes described herein, a database 245 can be stored and maintained on the non-persistent memory device 240. The database 245 can be an in-memory database. As used herein, "in-memory database" refers to a database maintained in main memory. As illustrated by FIG. 2, the non-persistent memory device 240 can be DRAM. A mirror 247 of the database 245 can be stored and maintained on the persistent memory device 230. The persistent memory device 230 can include a cross-point array of non-volatile memory cells on which the mirror 247 of the database 245 can be stored.

The host system 220 can be coupled to the non-persistent memory device 240 and the persistent memory device 230. The host system 220 can include a database core engine 242. The database core engine 242 can include circuitry, firmware, software, and combinations thereof. The database core engine 242 can be configured to issue database management commands, such as read commands (e.g., GET commands), write commands (e.g., SET commands), and/or erase data (e.g., SET commands) to the non-persistent memory device 240 and the persistent memory device 230. The database core engine 242 can include a memory allocator 243. The memory allocator 243 can include circuitry, firmware, software, and combinations thereof. The database core engine 242 uses the memory allocator 243 to issue database management commands to the non-persistent memory device 240 and/or the persistent memory device 230. For instance, the memory allocator 243 allocates and/or deallocates memory for data values corresponding to addresses of the non-persistent memory device 240 such that execution of commands issued by the database core engine 242 write and/or erase data values of the database 245 to the non-persistent memory device 240. The memory allocator 243 allocates and/or deallocates memory for data values corresponding to addresses of the persistent memory device 230 such that the same commands to the persistent memory device 230 update the mirror 247 of the database 245 concurrently with the database 245. Thus, any change to the database 245 is reflected in the mirror 247 of the database 245, often nearly simultaneously.

Updating the mirror 247 of the database 245 stored on the persistent memory device 230 concurrently with updates to the database 245 stored on the non-persistent memory device 240 provides a reliable, full mirror 247 of the database 245. To recover the database 245, the database 245 can be loaded onto the non-persistent memory device 240 from the mirror 247 of the database 245 stored on the persistent memory device 230. The database 245 can be loaded onto the non-persistent memory device 240 from the persistent database 247 without compression. The persistent memory device 230 and the persistent memory device 240 are capable of similar write speeds such that the persistent memory device 230 can keep up with commands sent from the data core engine 242 to the non-persistent memory device 240 and the persistent memory device 230. Although the non-persistent memory device 240 may be capable of faster write speeds than the persistent memory 230, the persistent memory 230 is not a bottleneck based on throughput of the data core engine 242.

Although some persistent memory devices, such as 3-D cross-point memory devices, provide fast access to data stored thereon, other memory devices, such as non-persistent memory devices, provide faster access to data stored thereon. Thus, to provide fast access to data values maintained in both the database 245 and the mirror 247 of the database 245, the database core engine 242 can be configured to provide commands to retrieve (e.g., read) data values from the non-persistent memory device 240, and not the persistent memory device 230. As illustrated by FIG. 2, SET commands 257 are provided to both the non-persistent memory device 240 and the persistent memory device 230. In contrast, GET commands 256 are provided to the non-persistent memory device 240, but not the persistent memory device 230.

In some embodiments, another persistent memory device, such as an SSD 248 illustrated by FIG. 2, can be coupled to the persistent memory device 230. A copy 249 of the mirror 247 of the database 245 can be stored and maintained on the SSD 248. Updates to the mirror 247 of the database 245 can trigger corresponding updates to the copy 249 of the mirror 247 of the database 245 stored on the SSD 248. Because the SSD 248 may not be capable of as fast write speeds as the non-persistent memory device 240 and the persistent memory device 230, the SSD 248 serves in a backup capacity only by storing the copy 249 of the mirror 247 of the database 245.

Figure 3:
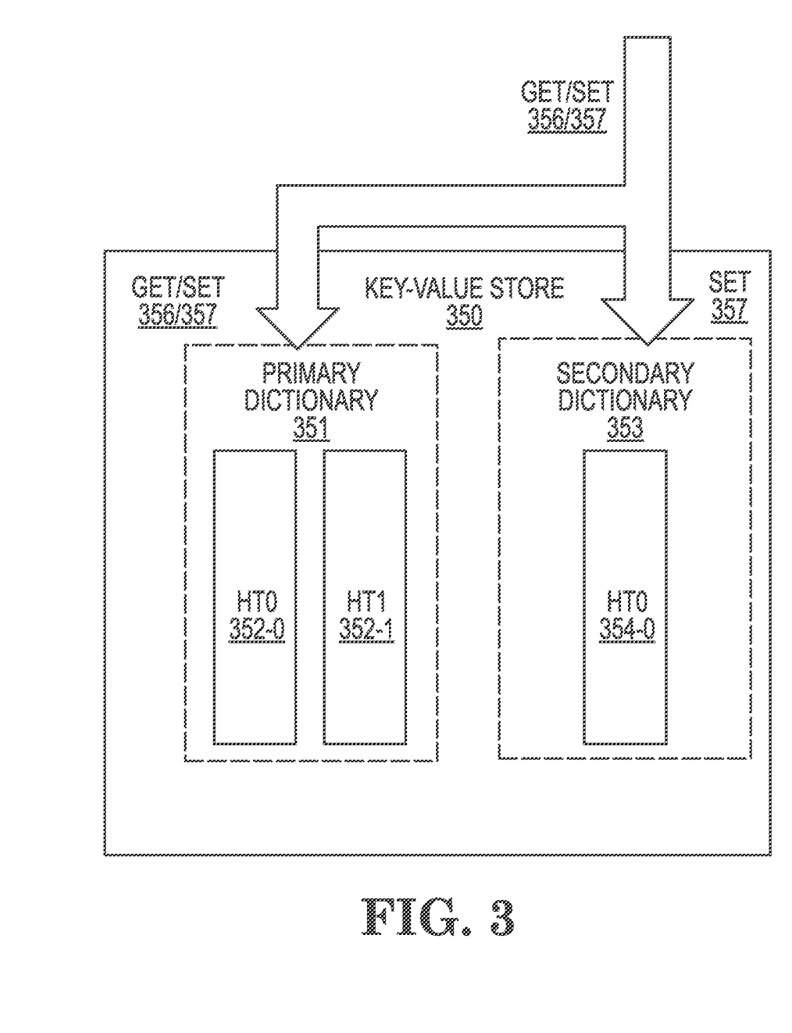
FIG. 3 is a block diagram representing a key-value store in accordance with some embodiments of the present disclosure.

FIG. 3 is a block diagram representing a key-value store 350 in accordance with some embodiments of the present disclosure. Key-value stores are a class of applications capable of managing associative memory arrays. The key-value store 350, for example, can store key-value pairs of multiple value types (e.g., strings, lists). The key-value store 350 can include a data structure referred to as a dictionary to store key-value pairs. As illustrated in FIG. 3, the key-value store 350 can comprise a primary dictionary 351 and a secondary dictionary 353. The primary dictionary 351 can be analogous to the database 245 and the secondary dictionary can be analogous to the mirror 247 of the database 245 described in association with FIG. 2, respectively. The primary dictionary 351 can be stored on a non-persistent memory device, such as the non-persistent memory device 240. The secondary dictionary 353 can be stored on a persistent memory device, such as the persistent memory device 230.

The key-value store 350 can be used as a cache (e.g., a volatile cache) to improve performance of a host system (e.g., the host system 220) by storing computations or data in memory. By maintaining the primary dictionary 351 and the secondary dictionary 353, some embodiments of the present disclosure can serve applications (executed by the host system 220, for example) that do not need data to be persistent as well as applications that need data to be persistent because that data cannot be recovered after a crash or a restart of the host system.

A dictionary can include one or more hash tables. For instance, as illustrated by FIG. 3, the primary dictionary 351 can include hash tables 352-0 and 352-1, and the secondary dictionary 353 can include the hash table 354-0. The hash tables 352-0, 352-1, and 354-0 can be used to retrieve, update, and/or manage key-value pairs. In some previous approaches, a dictionary may be stored in non-persistent memory only. In contrast, some embodiments of the present disclosure include storing the primary dictionary 351 in non-persistent memory and the secondary dictionary 353 in persistent memory. The secondary dictionary 353 can be a mirror of the primary dictionary 351.

As illustrated by FIG. 3, SET operations 357 performed using the primary dictionary 351 can be duplicated and performed using the secondary dictionary 353. However, GET operations 356 performed using the primary dictionary 351 are not duplicated. Memory allocations for the secondary dictionary 353 can be mapped to an address range of a persistent memory. Thus, the secondary dictionary 353 provides persistent data. Although the performance of a computing system utilizing the secondary dictionary 353 may be limited by the access latency of the persistent memory, the secondary dictionary 353 enables some embodiments of the present disclosure to have less access latency than previous approaches.

Figure 4:
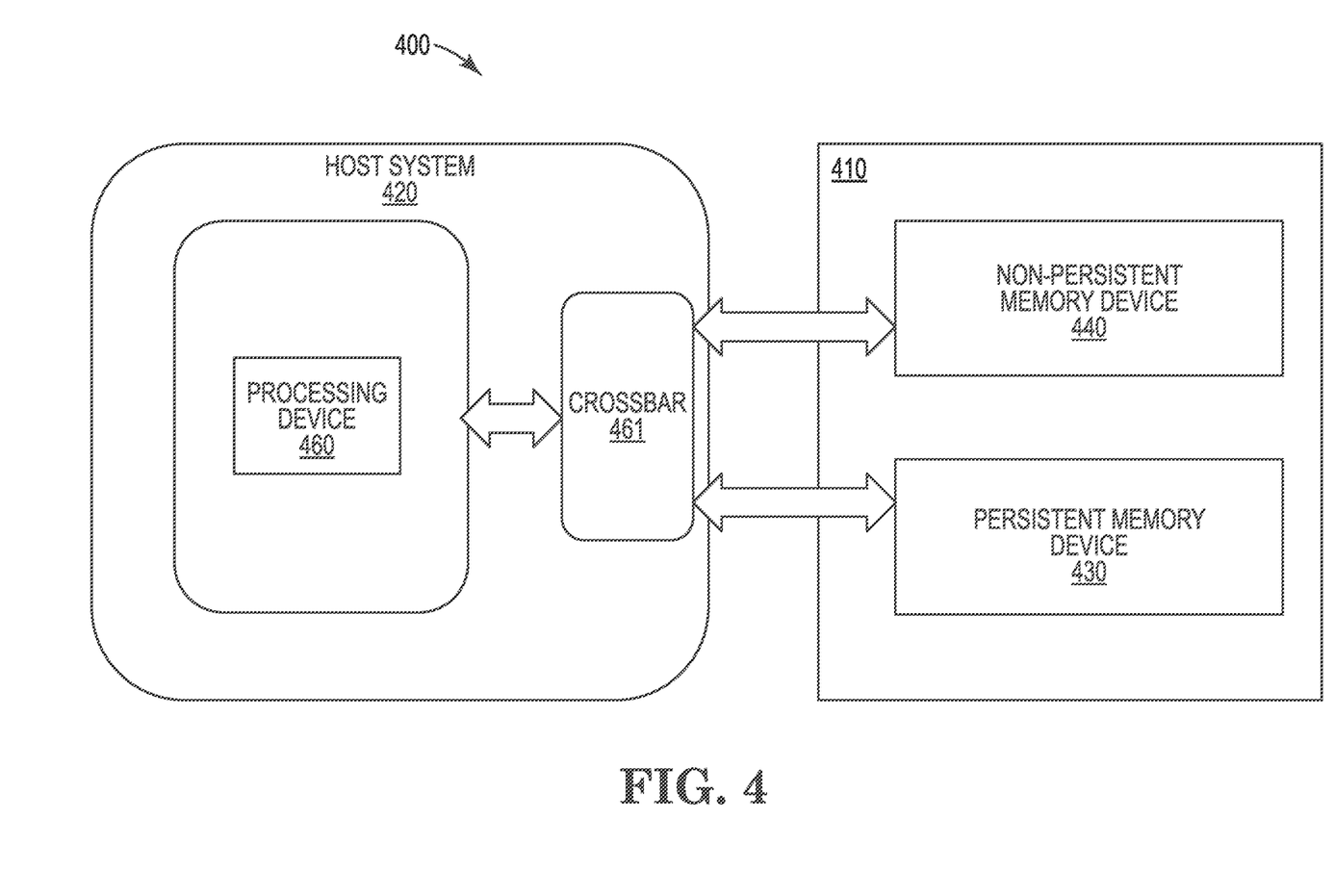
FIG. 4 is a block diagram representing a system for database persistence in accordance with some embodiments of the present disclosure.

FIG. 4 is a block diagram representing a system for database persistence in accordance with some embodiments of the present disclosure. The host system 420, non-persistent memory device 440, and persistent memory device 430 can be analogous to the host system 220, non-persistent memory device 240, and persistent memory device 230 described in association with FIG. 2.

The host system 420 can include a processing device 460. The processing device 460 can be a central processing unit (CPU). The host system 420 can include a crossbar (XBar) 461. The crossbar 461 can comprise software, hardware, and combinations thereof. Although not specifically illustrated by FIG. 4, the host system 420 can include a memory allocator (e.g., the memory allocator 243 described in association with FIG. 2). For example, the memory allocator can be part of the crossbar 461. As described in association with FIGS. 2-3, a database, such as a key-value store, can be stored and maintained on the non-persistent memory device 440. A mirror of a database stored on the non-persistent memory device 440 can be stored on the persistent memory device 430.

The host system 420 can be configured to cause requests for values of keys of a key-value store to be provided only to the non-persistent memory device 440 in response to a GET command from the processing device 460. The host system 420 can be configured to associate respective requests for key values with a first address within a first address range of the non-persistent memory device 440. The host system 420 can be configured to cause updates to the key-value store to be provided to the non-persistent memory device 440 and the persistent memory device 430 in response to a SET command from the processing device 460. The host system 420 can be configured to associate respective updates to the key-value store with a second address within the first address range of the non-persistent memory device 440 and a third address within a second address range of the persistent memory device 430.

The crossbar 461 can be configured to route respective requests for values of keys of the key-value store to the non-persistent memory device 440 based on the respective first addresses. The crossbar 461 can be configured to route the respective updates to the key-value store to non-persistent memory device 440 based on the respective second addresses. The crossbar 461 can be configured to route the respective updates to the key-value store to the persistent memory device 430 based on the respective third addresses. The crossbar 461 can be configured to map bytes corresponding to values of keys of the key-value store to addresses of the non-persistent memory device 440 or the persistent memory device 430.

Figure 5:
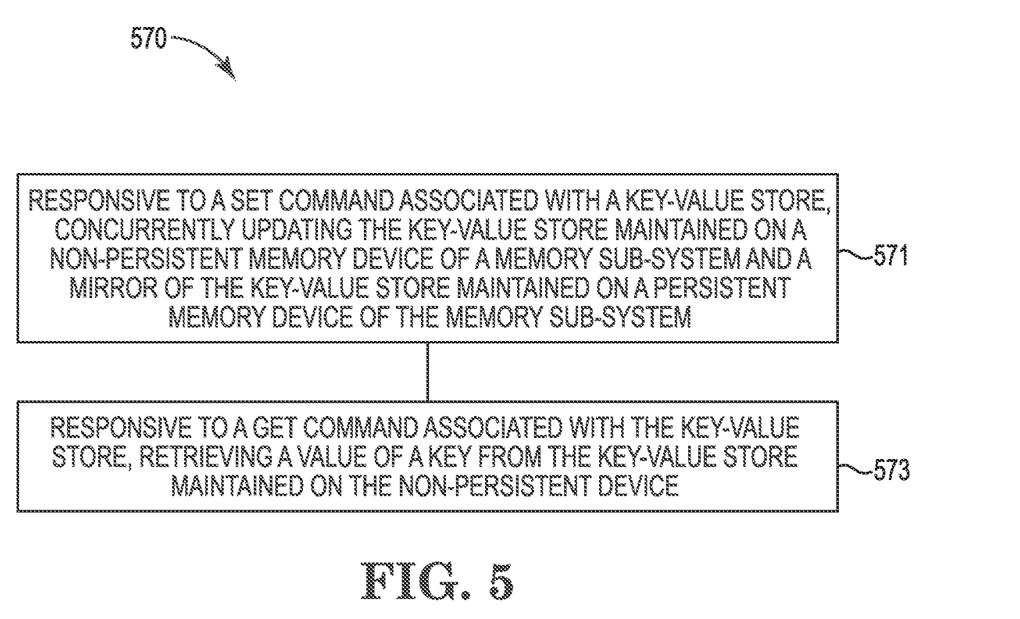
FIG. 5 is flow diagram corresponding to a method for database persistence in accordance with some embodiments of the present disclosure.

FIG. 5 is flow diagram corresponding to a method 570 for database persistence in accordance with some embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 570 is performed by the database persistence component 113 described in association with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 571, responsive to a SET command associated with a key-value store, a key-value store maintained on a non-persistent memory device of a memory sub-system and a mirror of the key-value store maintained on a persistent memory device of the memory sub-system can be updated concurrently. In some embodiments, the memory sub-system can be analogous to the memory sub-system 110 described in association with FIG. 1. Responsive to updating the copy of the key-value store maintained on the persistent memory device, a copy of the mirror of the key-value store value maintained on an SSD coupled to the persistent memory device can be updated.

At operation 573, responsive to a GET command associated with the key-value store, a value of a key can be retrieved from the key-value store maintained on the non-persistent memory device. In some embodiments, the method 570 can include loading the key-value store onto the non-persistent memory device using the mirror of the key-value store maintained on the persistent memory device.

Figure 6:
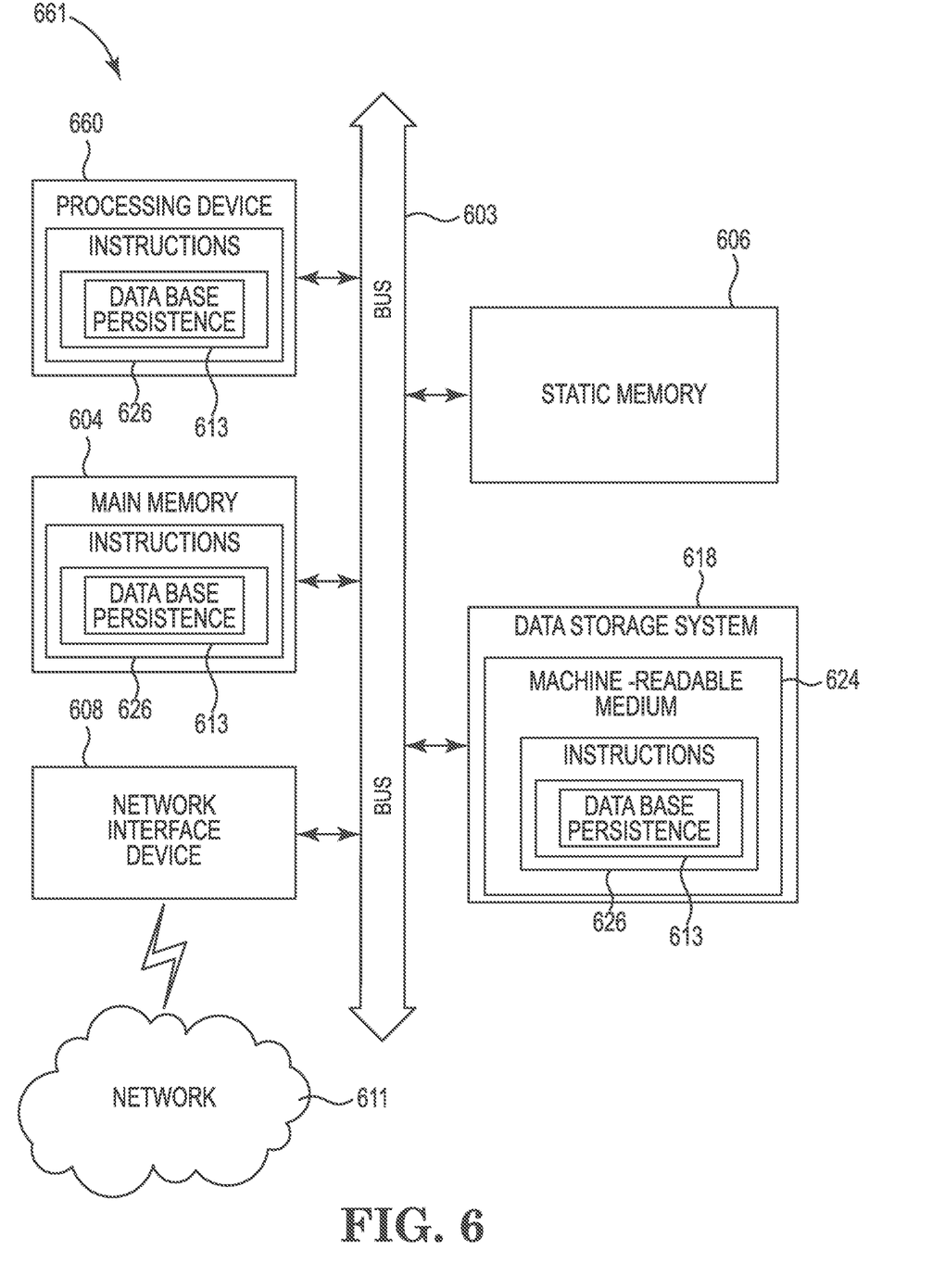
FIG. 6 is a block diagram of an example computer system in which embodiments of the present disclosure may operate.

FIG. 6 is a block diagram of an example computer system 661 in which embodiments of the present disclosure may operate. For example, FIG. 6 illustrates an example machine of a computer system 661 within which a set of instructions, for causing the machine to perform any one or more of the methodologies discussed herein, can be executed. In some embodiments, the computer system 661 can correspond to a host system (e.g., the host system 120 described in association with FIG. 1) that includes, is coupled to, or utilizes a memory sub-system (e.g., the memory sub-system 110) or can be used to perform the operations of a controller (e.g., to execute an operating system to perform operations corresponding to the database persistence component 113). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 661 includes a processing device 660 (e.g., the processing device 460 described in association with FIG. 4), a main memory 604 (e.g., ROM, flash memory, DRAM such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 660 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 660 can also be one or more special-purpose processing devices such as an application specific integrated circuit (ASIC), a field programmable gate array (FPGA), a digital signal processor (DSP), network processor, or the like. The processing device 660 is configured to execute instructions 626 for performing the operations and steps discussed herein. The computer system 661 can further include a network interface device 608 to communicate over the network 611.

The data storage system 618 can include a machine-readable storage medium 624 (also referred to as a computer-readable medium) on which one or more sets of instructions 626 or software embodying any one or more of the methodologies or functions described herein is stored. The instructions 626 can also reside, completely or at least partially, within the main memory 604 and/or within the processing device 660 during execution thereof by the computer system 661, the main memory 604 (e.g., the persistent memory device 130 and/or the non-persistent memory device 140), and the processing device 660 also constituting machine-readable storage media. The machine-readable storage medium 624, data storage system 618, and/or main memory 604 can correspond to the memory sub-system 110.

In some embodiments, the instructions 626 can include instructions to implement functionality corresponding to a database persistence component (e.g., the data persistence component 113). For instance, the instructions 626 can include instructions to maintain a primary dictionary (e.g., the primary dictionary 351 described in association with FIG. 3) of a database on a non-persistent memory device (e.g., the main memory 604) and maintain a secondary dictionary (e.g., the secondary dictionary 353) of the database on a persistent memory device (e.g., the data storage system 618). The instructions 626 can include instructions to retrieve values of the database from the primary dictionary only. The instructions 626 can include instructions to concurrently reflect updates to the database in both the primary dictionary maintained on the non-persistent memory device and the secondary dictionary maintained on the persistent memory device. The instructions 626 can include instructions to maintain values of the database in a first number of hash tables of the primary dictionary and a second number of hash tables of the secondary dictionary. The instructions 626 can include instructions to maintain the secondary dictionary as a mirror of the primary dictionary. The instructions 626 can include instructions to maintain values of the database in the primary dictionary based on respective data temperatures of the values and maintain all values of the database in the secondary dictionary irrespective of data temperatures of all the values. The instructions 626 can include instructions to remove a value of the database from the primary dictionary in response to a data temperature of the value being below a threshold data temperature.

While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
responsive to a SET command associated with a key-value store, concurrently updating:
the key-value store maintained on a non-persistent memory device of a memory sub-system; and
a minor of the key-value store maintained on a persistent memory device of the memory sub-system; and
responsive to a GET command associated with the key-value store, retrieving a value of a key from the key-value store maintained on the non-persistent device and not providing the GET command to the non-persistent memory device.

2. The method of claim 1, wherein retrieving comprises retrieving the value of the key from the key-value store maintained on the non-persistent memory device only.

3. The method of claim 1, further comprising, responsive to updating the mirror of the key-value store maintained on the persistent memory device, updating a copy of the mirror of the key-value store value maintained on a solid state drive (SSD) coupled to the persistent memory device.

4. The method of claim 1, further comprising loading the key-value store onto the non-persistent memory device using the mirror of the key-value store maintained on the persistent memory device.

5. An apparatus, comprising:
a non-persistent memory device configured to store a read-and-write version of a database;
wherein the non-persistent memory device is configured to receive signaling indicative of a GET command associated with the database; and
a persistent memory device configured to store a write-only version as a mirror of the database concurrently with the read-and-write version of the database stored on the non-persistent memory device;
wherein the persistent memory device is configured not to receive the signaling indicative of the GET command.

6. The apparatus of claim 5, wherein the non-persistent memory device comprises random access memory (RAM).

7. The apparatus of claim 5, wherein the database comprises a key-value store.

8. The apparatus of claim 5, wherein the non-persistent memory device and the persistent memory device are configured to receive signaling indicative of a SET command associated with the database concurrently.

9. The apparatus of claim 5, further comprising another persistent memory device coupled to the persistent memory device and comprising a different type of persistent memory than the persistent memory device,
wherein the other persistent memory device is configured to store a copy of the write-only version of the database concurrently with the write-only version of the database stored on the persistent memory device.

10. A system, comprising:
a host system comprising a processing device; and
a memory sub-system comprising:
a non-persistent memory device coupled to the host system and configured to store a key-value store; and
a persistent memory device coupled to the host system and configured to store a mirror of the key-value store,
wherein the host system is configured to:
cause requests for values of keys of the key-value store to be provided to the non-persistent memory device in response to a GET command from the processing device;
cause requests for values of keys of the key-value store not to be provided to the non-persistent memory device in response to the GET command; and
cause updates to the key-value store to be provided to the non-persistent memory device and the persistent memory device concurrently in response to a SET command from the processing device.

11. The system of claim 10, wherein the host system is further configured to:
associate requests for values of keys of the key-value store with a respective first address within an address range of the non-persistent memory device; and
associate updates to the key-value store with a respective second address within the address range of the non-persistent memory device and a respective third address within an address range of the persistent memory device.

12. The system of claim 11, wherein the host system further comprises a crossbar coupled to the processing device, the non-persistent memory device, and the persistent memory device,
wherein the crossbar is configured to:
route the requests for values of keys of the key-value store to the non-persistent memory device only based at least in part on the respective first addresses;
route the updates to the key-value store to the non-persistent memory device based at least in part on the respective second addresses; and
route the updates to the key-value store to the persistent memory device based at least in part on the respective third addresses.

13. The system of claim 12, wherein the crossbar comprises software executed by the host system.

14. The system of claim 12, wherein the crossbar is further configured to map bytes corresponding to values of keys of the key-value store to addresses of the non-persistent memory device or the persistent memory device.

15. The system of claim 12, further comprising another persistent memory device coupled to the persistent memory device and the crossbar,
wherein the other persistent memory device is configured to store a copy of the minor of the key-value store concurrently with the mirror of the key-value store stored on the persistent memory device, and
wherein the crossbar is configured to:
address the persistent memory device at a byte-level, and
address the other persistent memory device at a page-level.

16. A non-transitory medium storing instructions executable by a processing device to:
maintain a primary dictionary of a database on a non-persistent memory device;
maintain a secondary dictionary of the database on a persistent memory device as a mirror of the primary dictionary;
request values of the database from the primary dictionary on the non-persistent memory device only without requesting the values from the secondary database on the persistent memory device; and
concurrently reflect updates to the database in both the primary dictionary maintained on the non-persistent memory device and the secondary dictionary maintained on the persistent memory device.

17. The medium of claim 16, further storing instructions executable to maintain values of the database in a first number of hash tables of the primary dictionary and a second number of hash tables of the secondary dictionary.

18. The medium of claim 16, further storing instructions executable to:
maintain values of the database in the primary dictionary based at least in part on respective data temperatures of the values; and
maintain all values of the database in the secondary dictionary irrespective of data temperatures of all the values.

19. The medium of claim 18, further storing instructions to remove a value of the database from the primary dictionary in response to a data temperature of the value being below a threshold data temperature.

20. The medium of claim 16, further storing instructions to recover the database by loading the database onto the non-persistent memory device from the mirror of the database stored on the persistent memory device.

21. The method of claim 1, further comprising recovering the key-value store by loading the key-value store onto the non-persistent memory device from the minor of the database stored on the persistent memory device.

22. The apparatus of claim 5, wherein the non-persistent memory device and the persistent memory device are configured to load the database onto the non-persistent memory device from the mirror of the database stored on the persistent memory device.

23. The system of claim 10, wherein the non-persistent memory device and the persistent memory device are configured to load the key-value store onto the non-persistent memory device from the mirror of the key-value store stored on the persistent memory device.

* * * * *

UNITED STATES PATENT AND TRADEMARK OFFICE
CERTIFICATE OF CORRECTION

Page 1 of 1

PATENT NO. : 11,853,605 B2
APPLICATION NO. : 17/478570
DATED : December 26, 2023
INVENTOR(S) : Sai Vineel Reddy Chittamuru et al.

It is certified that error appears in the above-identified patent and that said Letters Patent is hereby corrected as shown below:

In the Claims

In Claim 1, at Column 14, Lines 41-42, "...the non-persistent device ..." should read "...the non-persistent memory device...".

In Claim 16, at Column 16, Line 24, "...the secondary database..." should read "...the secondary dictionary...".

Signed and Sealed this
Twenty-third Day of December, 2025

John A. Squires
*Director of the United States Patent and Trademark Office*